(12) United States Patent
Veeser et al.

(10) Patent No.: US 8,871,011 B2
(45) Date of Patent: Oct. 28, 2014

(54) ELECTRET FILTER ELEMENT AND METHOD FOR THE MANUFACTURE THEREOF

(75) Inventors: Klaus Veeser, Weinheim (DE); Martin Krause, Hirschberg (DE); Toan-Hieu Giang, Viernheim (DE); Jochen Zabold, Birkenau (DE)

(73) Assignee: Carl Freudenberg KG, Weinheim (DE)

( * ) Notice: Subject to any disclaimer, the term of this patent is extended or adjusted under 35 U.S.C. 154(b) by 656 days.

(21) Appl. No.: 13/063,484

(22) PCT Filed: Aug. 27, 2009

(86) PCT No.: PCT/EP2009/006217
§ 371 (c)(1),
(2), (4) Date: Mar. 11, 2011

(87) PCT Pub. No.: WO2010/031490
PCT Pub. Date: Mar. 25, 2010

(65) Prior Publication Data
US 2011/0168024 A1  Jul. 14, 2011

(30) Foreign Application Priority Data

Sep. 16, 2008 (DE) .......................... 10 2008 047 552

(51) Int. Cl.
| | | |
|---|---|---|
| *B03C 3/16* | (2006.01) | |
| *B05D 1/04* | (2006.01) | |
| *D06M 11/76* | (2006.01) | |
| *D06M 23/06* | (2006.01) | |
| *D06M 11/13* | (2006.01) | |
| *D04H 3/02* | (2006.01) | |
| *D06M 11/05* | (2006.01) | |
| *B01D 39/16* | (2006.01) | |

(52) U.S. Cl.
CPC ................ *D04H 3/02* (2013.01); *D06M 11/76* (2013.01); *D06M 23/06* (2013.01); *B01D 2239/10* (2013.01); *B01D 2239/0435* (2013.01); *D06M 11/13* (2013.01); *D06M 11/05* (2013.01); *D06M 2200/00* (2013.01); *B01D 39/1623* (2013.01); *Y10S 264/48* (2013.01); *Y10S 55/05* (2013.01)
USPC ............... 96/69; 264/416; 264/456; 264/466; 264/467; 264/DIG. 48; 55/DIG. 5

(58) Field of Classification Search
CPC .................................................. B01D 39/1623
USPC .............. 95/59, 71, 72; 96/15, 27, 52, 53, 69; 55/DIG. 5, DIG. 39; 264/416, 454, 456, 264/466, 467, DIG. 8, DIG. 48
See application file for complete search history.

(56) References Cited

U.S. PATENT DOCUMENTS 3,757,491 A * 9/1973 Gourdine .......................... 96/27
3,807,137 A * 4/1974 Romell ............................. 95/72

(Continued)

FOREIGN PATENT DOCUMENTS

| AT | 3 80 126 B | 4/1986 |
|---|---|---|
| DE | 101 09 474 C1 | 6/2002 |

(Continued)

OTHER PUBLICATIONS

International Search Report for PCT/EP2009/006217, mailed on Feb. 19, 2010.

*Primary Examiner* — Duane Smith
*Assistant Examiner* — Sonji Turner
(74) *Attorney, Agent, or Firm* — Leydig, Voit & Mayer, Ltd.

(57) ABSTRACT

A method for manufacturing an electret filter element includes preparing fibers and producing, by a spray device, a spray mist of fluid droplets which include an electrical charge formed by an electric field between detaching fluid droplets and a counter-electrode. The fibers are passed through the spray mist so as to wet the fibers with the fluid droplets. The fibers are laid down to form a fibrous layer.

20 Claims, 6 Drawing Sheets

(56) References Cited

U.S. PATENT DOCUMENTS

| | | | |
|---|---|---|---|
| 4,095,962 A * | 6/1978 | Richards | 95/65 |
| 4,143,196 A * | 3/1979 | Simm et al. | 428/212 |
| 4,215,682 A | 8/1980 | Kubik et al. | |
| 4,375,718 A * | 3/1983 | Wadsworth et al. | 29/886 |
| 4,473,863 A | 9/1984 | Magee | |
| 4,513,049 A * | 4/1985 | Yamasaki et al. | 428/194 |
| 4,749,348 A * | 6/1988 | Klaase et al. | 425/174.8 E |
| 5,350,620 A * | 9/1994 | Sundet et al. | 428/172 |
| 5,429,848 A * | 7/1995 | Ando et al. | 428/36.2 |
| 5,976,208 A | 11/1999 | Rousseau et al. | |
| 6,119,691 A * | 9/2000 | Angadjivand et al. | 128/206.19 |
| 6,123,752 A * | 9/2000 | Wu et al. | 96/69 |
| 6,827,764 B2 * | 12/2004 | Springett et al. | 96/66 |
| 7,070,836 B2 | 7/2006 | Czado | |
| 7,780,761 B2 * | 8/2010 | Gu et al. | 95/66 |
| 7,883,034 B2 * | 2/2011 | Matsui et al. | 239/695 |
| 7,906,080 B1 * | 3/2011 | Botvinnik | 422/186.04 |
| 2005/0077646 A1 * | 4/2005 | Akiba et al. | 264/211.12 |
| 2006/0144971 A1 * | 7/2006 | Nakada et al. | 239/690 |
| 2006/0254419 A1 | 11/2006 | Leonard | |

FOREIGN PATENT DOCUMENTS

| | | | |
|---|---|---|---|
| EP | 0 363 033 A2 | 4/1990 | |
| EP | 447166 A2 * | 9/1991 | 55/DIG. 39 |
| EP | 0 550 029 A1 | 7/1993 | |
| EP | 0 845 058 A1 | 6/1998 | |
| EP | 1 471 176 A1 | 10/2004 | |
| JP | 2002 161467 A | 6/2002 | |
| JP | 2002 161471 A | 6/2002 | |
| WO | WO 01/27371 A1 | 4/2001 | |

* cited by examiner

ELECTRET FILTER ELEMENT AND METHOD FOR THE MANUFACTURE THEREOF

CROSS-REFERENCE TO PRIOR APPLICATIONS

This application is a U.S. National Phase application under 35 U.S.C. §371 of International Application No. PCT/EP2009/006217, filed on Aug. 27, 2009, and claims benefit to German Patent Application No. DE 10 2008 047 552.1, filed on Sep. 16, 2008. The International Application was published in German on Mar. 25, 2010 as WO 2010/031490 under PCT Article 21 (2).

FIELD

The present invention relates to a method for manufacturing an electret filter element and to an electret filter element having at least one fibrous layer.

BACKGROUND

The European Patent Application EP 1 471 176 A1 describes a method whereby fibers are passed through a spray mist of fluid droplets. The fluid droplets are smaller than 20 μm in size. This method provides for electrically charging the fluid droplets in a separation process utilizing the Lenard effect ("Lenard charging effect"). Once charged, the liquid droplets are passed, together with the fibers, through an electric field. In this method, statistically distributed fluid droplets having different polarities are formed. Thus, both positively, as well as negatively charged fluid droplets are formed in this case, and the distribution thereof can only be controlled with difficulty. Moreover, the polarity of the electric charge of the fluid droplets is dependent on the size thereof. The mechanical spraying divides the fluid droplets into large and small fluid droplets, each having a different electric charge.

Filter elements of the type described at the outset are likewise already known from the related art. In particular, it is known to use different methods to charge nonwoven fabrics made of microfibers. The European Patent Application EP 0 845 058 A1 discusses a method for producing filter elements having a very high filtration efficiency. These filter elements are distinguished by a very high filtration efficiency against fine aerosols.

The method known from the European Patent Application EP 0 845 058 A1 provides for applying water droplets as charge carriers to a finished nonwoven fabric. The water droplets, which are applied at the same time, have different charges. To improve the electric charge capacity, an additive is admixed with the polymer from which the fibers of the nonwoven are produced.

The inherent disadvantage of this method is that the water droplets are sprayed onto the already finished nonwoven fabric. Employing this method causes filter effects to occur which prevent a continuous distribution of the charges within the nonwoven fabric. The denser the nonwoven fabric that is used is, the higher the water pressures are that are to be used to homogeneously distribute charges within the nonwoven fabric. However, these high water pressures can negatively alter or even destroy the structure of the nonwoven fabric.

Moreover, a drying process is required following the spray application of large quantities of water. During the drying process, the nonwoven fabric is thermally treated, which can result in a reduction of the electric charge. Therefore, it is generally preferred that the drying process take place at low temperatures in a vacuum. This entails a substantial outlay for equipment and involves considerable costs.

SUMMARY

In an embodiment, the present invention provides a method for manufacturing an electret filter element that includes preparing fibers and producing, by a spray device, a spray mist of fluid droplets which include an electrical charge formed by an electric field between detaching fluid droplets and a counter-electrode. The fibers are passed through the spray mist so as to wet the fibers with the fluid droplets. The fibers are laid down to form a fibrous layer.

BRIEF DESCRIPTION OF THE DRAWINGS

The present invention will be described in even greater detail below based on the exemplary figures with reference to practical implementations of the method. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
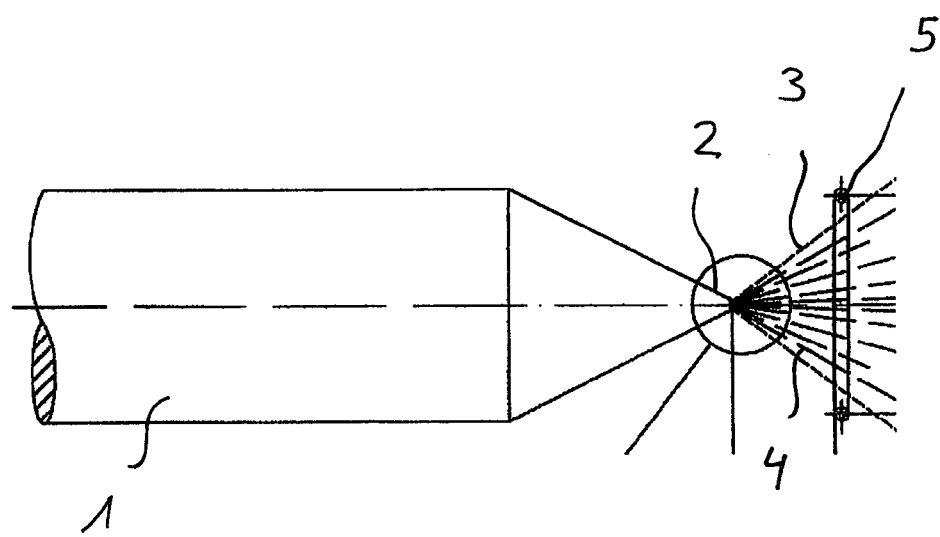
FIG. 1 is a side view of a spray device according to an embodiment of the present invention having a ring electrode opposing the same.

It is, therefore, an aspect of the present invention to provide an electret filter element that will feature a homogeneous charge distribution and a high filtration efficiency in the context of a cost-effective manufacturing.

In an embodiment, the present invention provides a method for manufacturing an electret filter element that includes the following steps: preparing fibers; providing a spray device for a fluid; producing a spray mist of electrically charged fluid droplets; passing the fibers through the spray mist; wetting the fibers with the fluid droplets and laying down the fibers to form a fibrous layer. In an embodiment, the present invention provides an electret filter element having at least one fibrous layer having fibers which carry electric charges.

According to an embodiment, the fluid droplets are electrically charged by an electric field between detaching fluid droplets and a counter-electrode.

In accordance with an embodiment of the present invention, the fluid droplets are polarized by an electric field that forms between a counter-electrode and the detaching fluid droplet itself. This electric field produces an excess charge on the fluid droplet that remains following the detachment thereof.

In this embodiment, the fluid droplets are not only polarized by the electric field when they detach at the spray device, but are also charged with a predetermined charge. Therefore, the fluid droplets are not charged randomly with a certain distribution, but rather uniformly. In an embodiment, all of the fluid droplets produced by the spray device carry like electric charges, i.e., exhibit the same electric polarity.

Therefore, the present invention recognizes that the charge on the fluid droplets is not randomly generated, but rather may be generated in a specific way by an electric field in a process that provides a controllable distribution. In particular, the realization has been made that it is possible to produce fluid droplets of a uniform electric charge, in order to charge fibers with exclusively one electric charge of a uniform polarity.

Moreover, the present invention recognizes that the electric field makes it possible to achieve a significantly higher charge quantity per fluid droplet surface area. Therefore, using a relatively small quantity of the fluid, the electret filter element according to the present invention may exhibit a very strong electric charge. By using a relatively small quantity of the fluid, the need for intensely heating the electret filter element to dry the same can be eliminated, so that, on the one hand, energy is saved and, on the other hand, the electric charge on the electret filter element is not weakened.

This method advantageously makes it possible for a fluid to be sprayed at a low pressure onto fibers before they are laid down to form a fibrous layer. Any change in the structure of the fibrous layer is hereby avoided.

Moreover, the fibers may be provided with charges in such a way that they exhibit a sufficient charge quantity even within the laid down fibrous layer. This method makes it possible to produce fibrous layers having a spatially homogeneous fiber charge over the entire thickness cross section; in terms of its structure, the fibrous layer being virtually unaffected by the fluids.

In this context, it is possible to produce a spray mist in which 60% or more than 60% of the electrically charged fluid droplets present therein have an electric charge of the same polarity. This allows the fibers to be provided with a virtually uniform electric charge. A spray mist is preferably produced in which 80% or more than 80% of the electrically charged fluid droplets present therein have an electric charge of the same polarity.

A spray mist may be produced in which the polarity of the electric charge of the fluid droplets present therein is independent of the fluid droplet size. A uniform, homogeneous and material-protecting wetting of the fibers is thereby made possible.

The fibers may be passed through the spray mist on the side of the counter-electrode facing away from the spray device. This allows the material, from which the fibers are produced, to remain substantially unaffected by the electric field. Therefore, the fluid droplets are passed through a strong electric field; the fibers through a virtually field-free space.

The electrical voltage between the detaching fluid droplets and the counter-electrode is determined as a function of the geometric configuration and the fluid that is used. Preferred values for the electrical voltage are between 60 and 15,000 volts. At larger distances between the spray device and the counter-electrode, it is also conceivable to generate voltages of between 30,000 and 100,000 volts. The counter-electrode may be designed as a ring electrode. The ring electrode design is advantageous since a conical spray mist is able to penetrate the inside of the ring. The values for diameter d of the ring electrode and distance x of the ring electrode from the tip of the spray device are to be determined empirically and depend on the electric field strength at the detachment site of the fluid droplet. Moreover, value d depends on the dimensions of the cone of the conical spray mist. Preferably, d is between 10 and 50 mm, and x between 5 and 40 mm. Moreover, the counter-electrode may be configured as a point-contact electrode within a hollow spray cone.

A nozzle may be used as a spray device. A nozzle has a relatively narrow discharge region where a fluid may detach and be dispersed into fluid droplets. Care should be taken to ensure that the nozzle is made of a non-conductive material or is electrically insulated at the discharge site of the fluid droplet. Moreover, as a spray device, an embodiment of the present invention uses an aerosol source that generates a defined size distribution of the fluid droplets, for example, a vibrating-orifice aerosol generator.

The fluid droplets may be charged by an electric field having a polarity that changes periodically over time. The frequency of this periodic change is to be selected as a function of the velocity at which the fibers pass the spray device, and of the desired charge distribution. This embodiment makes it possible to use fluid droplets having a different electric charge, respectively different polarity, to charge the fibers traveling past. According to a further embodiment, a plurality of charges of a different polarity are distributed on one single fiber. In this context, a striation-like charging, respectively a striation-patterned charging of the fibers is possible.

According to an embodiment, the fibers may be produced and prepared in a melt-blowing process. This embodiment allows the fibers to be passed through the spray mist and charged immediately upon the creation thereof in a melt-blowing process. A fluid may be used in the process that is sprayed at a low pressure onto the fibers. The fibers are not laid down to form a fibrous layer until after they are charged, thereby preventing the structure of the fibrous layer from being adversely affected by the fluid droplets.

The fluid may be vaporized on the fibers, the fibers being thereby charged by the electric charge of the fluid droplets. When a melt-blowing process is used to produce the fibers, the fibers hold a process heat immediately upon exiting the melt-blowing nozzle. This process heat may be used to vaporize the fluid droplets that accumulate on the fibers traveling past. Moreover, directly upon leaving the melt-blowing nozzle, fibers produced in a melt-blowing process are still soft. Here the advantage is derived that the polymers, from which the melt-blown fibers are produced, may be readily modified and charged by the electrically charged fluid droplets. Therefore, this electric charge is, so to speak, frozen in the polymers when these cool. The charges are not only located at the surface, but also inside of the fibers, resulting in a substantially longer lifetime.

According to an embodiment, a plurality of fibrous layers may be laid down one over the other. This embodiment makes it possible to create an electret filter element that has different fibrous layers having different electric charges, respectively polarities. A further embodiment provides, for example, an alternating sequence of negatively and positively charged fibrous layers that is formed as a laminate.

The fibers may be passed between two spray mists. This makes it possible to charge both sides of a fiber stream or fibers of a fiber stream.

The fibers may be passed between two spray mists, the fluid droplets being electrically charged by oppositely or equidirectionally oriented electric fields between the detaching fluid droplets and the particular counter-electrodes. This makes it possible to charge both sides of a fiber stream or fibers of a fiber stream, electric charges of either the same or different polarity can be applied to both sides.

To generate the spray mist, a fluid may be used in which a conductivity salt is dissolved. This makes it possible to determine whether an electret filter element was fabricated in accordance with the method described here, since the conductivity salt and the distribution thereof on the fibers of the electret filter element may be analytically verified. The conductivity salt may be in the form of NaCl or ammonium hydrogencarbonate.

In an embodiment, the present invention provides an electret filter element having electric charges created by charged fluid droplets that were charged in an electric field, the fluid droplets having been electrically charged by an electric field between detaching fluid droplets and a counter-electrode.

In an embodiment, the filtration efficiency of the electret filter element is improved by the increased charge quantity in the fluid droplets, so that a γ-value of >0.14 is reached. In this context, the γ-value is determined from the equation:

$$\gamma = (-\ln(\text{penetration}))/\text{pressure difference}.$$

In this context, the pressure difference between the incident flow side and the outflow side of an electret filter element is entered in Pascals. ln (penetration) refers to values of between 0 and 1 that are used for the penetration, 1 denoting a 100% degree of penetration. This means that all particles pass through an electret filter element surface upon which the flow is incident. A value of 0 expresses that all particles are restrained. The particles are in the form of NaCl particles having an average diameter of 0.26 μm. The concentration of the NaCl in the incident fluid stream is 12 to 20 mg/m$^3$.

According to an embodiment, the fibers may carry like charges within one fibrous layer. This embodiment makes it possible to create an electret filter element that is composed of a plurality of different fibrous layers having different electric polarities.

In this context, the fibers can carry charges of a different polarity within one fibrous layer, a plurality of charges of different polarity being distributed over at least one of the fibers. A multiplicity of microfields may be generated in this manner on one fiber, so that the entire fibrous layer features an especially high separation efficiency for fine aerosols.

In a side view, FIG. 1 shows a spray device 1 that is designed as a nozzle. A conical spray mist 3, composed of individual fluid droplets 4, exits from tip 2 of spray device 1. Fluid droplets 4 are electrically charged. The charging process is carried out by an electric field that forms between detaching fluid droplets 4a and a ring electrode 5 (see FIG. 2).

In spray mist 3, 60% or more than 60% of electrically charged fluid droplets 4 present therein have an electric charge 4b of the same polarity. In spray mist 3, the polarity of the electric charge 4b of fluid droplets 4 present therein is independent of the fluid droplet size.

Figure 2:
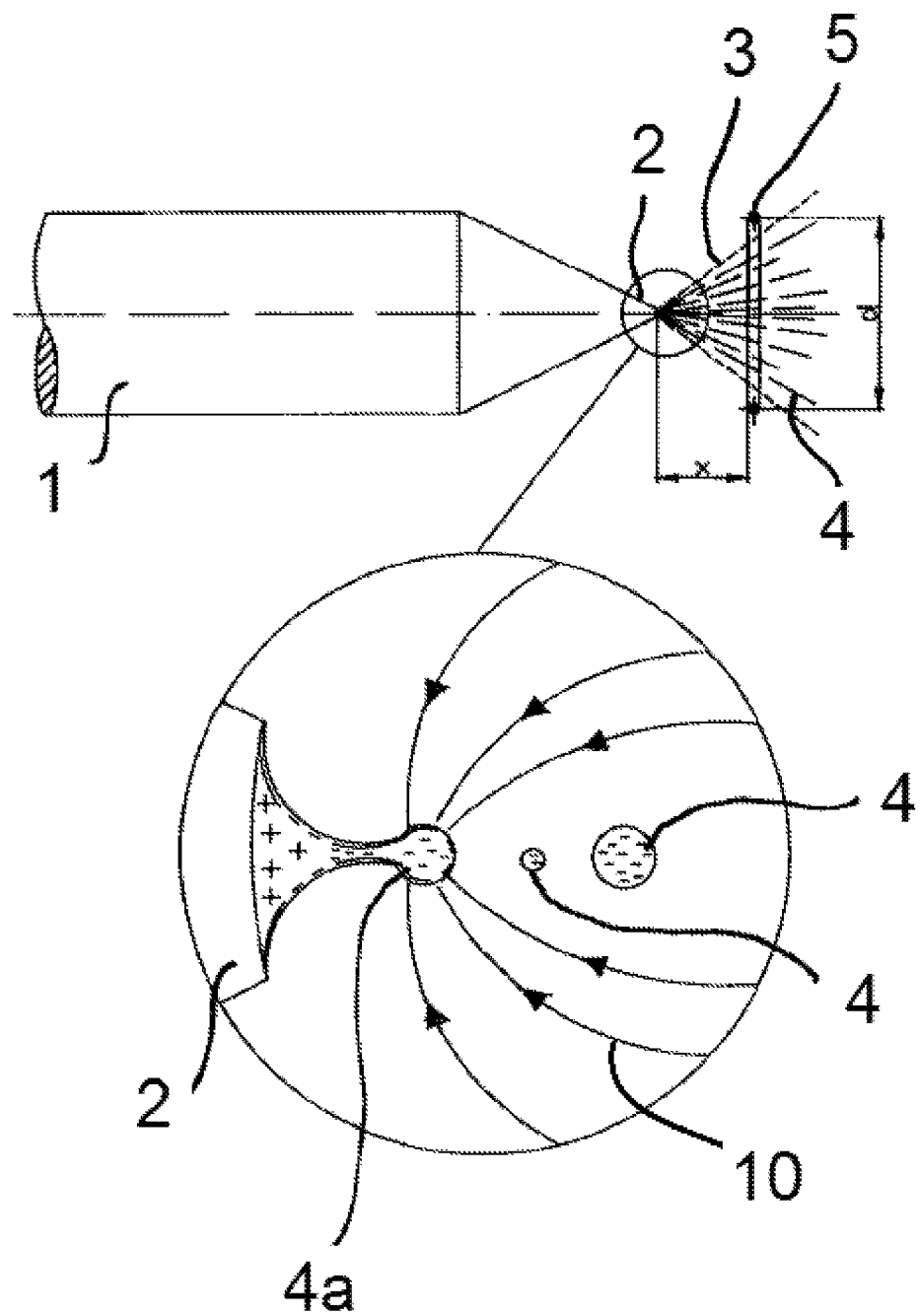
FIG. 2 is a detail view of the tip of the spray device including a representation of the orientation of the electric field relative to the detaching fluid droplets.

In a detail view (circular view), FIG. 2 shows tip 2 of spray device 1 in accordance with FIG. 1 from where fluid droplets 4 exit and detach. In the case illustrated here, before detaching in response to an electric field 10 whose field lines are represented by arrows, fluid droplets 4a are charged in a specific way with a negative electric charge 4b.

Figure 3:
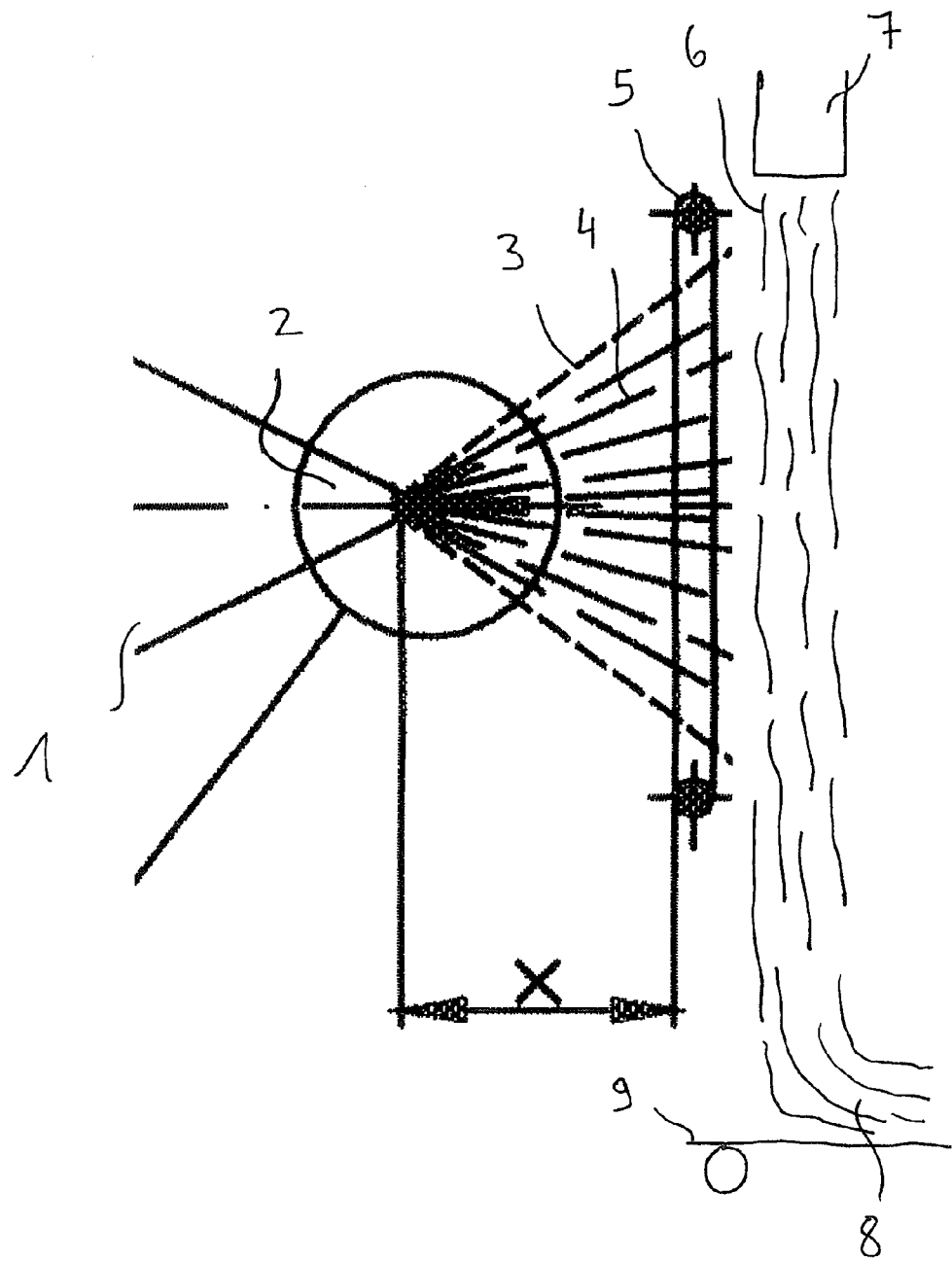
FIG. 3 is a schematic view of fibers according to an embodiment of the present invention, which are produced by a melt-blowing process and are passed through a conical spray mist of electrically charged fluid droplets.

In a schematic view, FIG. 3 shows spray device 1, from whose tip 2, a spray mist 3 emerges. Spray mist 3 is composed of electrically charged fluid droplets 4. Fluid droplets 4 are charged by an electric field that forms between detaching fluid droplets 4a and a ring electrode 5. Ring electrode 5 has a distance x of approximately 5 to 40 mm to the outlet orifice of tip 2. The interruption in the electrical connection to grounded spray device 1 or to the grounded fluid caused by the detachment of fluid droplet 4 prevents a charge equalization. The specific negative charges remain on fluid droplet 4 and may thus be transported to fiber 6.

The electret filter element according to an embodiment of the present invention is manufactured in accordance with the following process:

Fibers 6 are prepared, which are extruded from a melt-blowing nozzle 7. Moreover, a spray device 1 is provided which produces a spray mist 3 of electrically charged fluid droplets 4. Spray mist 3 is configured as a spray cone. Fibers 6 are passed through conical spray mist 3. Fibers 6 are passed through spray mist 3 on the side of counter-electrode 5 facing away from spray device 1. In the process, fibers 6 are wetted by fluid droplets 4. Fibers 6 are subsequently laid down to form a fibrous layer 8. The laying process takes place on a conveyor belt 9, so that a continuous production of a fibrous layer 8 is possible.

Fluid droplets 4 are electrically negatively charged by the electric field between counter-electrode 5 and detaching fluid droplet 4a. A nozzle is used as a spray device 1. Fibers 6 are produced and prepared in a melt-blowing process. Fibers 6 are microfibers which have a diameter of between 0.1 and 20 μm. The fluid is water. The fluid, respectively the water, features an electric conductivity that facilitates a polarizability of detaching fluid droplet 4a in response to the electric field strength present at the detachment site of fluid droplet 4a. The electric conductivity may be modified by a suitable additive, for example a conductivity salt, such as NaCl or ammonium hydrogencarbonate. It is preferable that the additive not remain on fiber 6. However, the additive may advantageously remain on fibers 6 in quantities that are not critical to the application, in order to be verifiable using suitable analytics.

Figure 4:
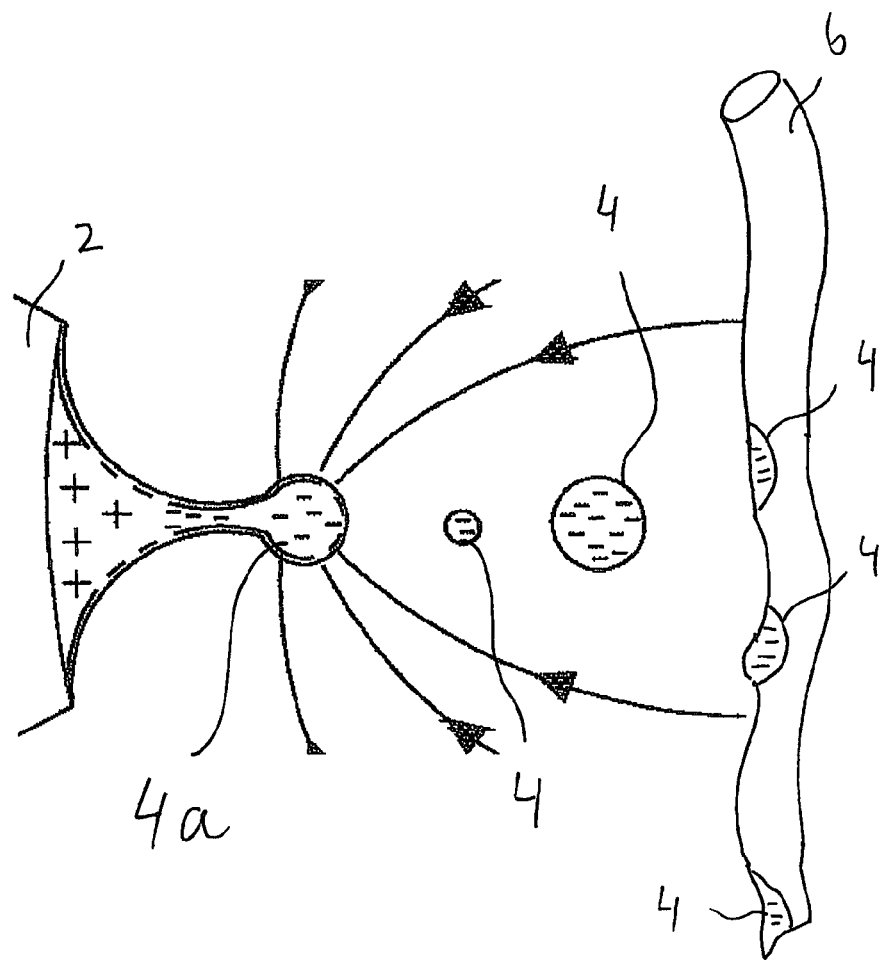
FIG. 4 is a schematic view of the individual fibers on which exemplarily negatively charged fluid droplets accumulate.

FIG. 4 shows a detail view (not to scale) of a fiber 6, on which exemplarily negatively charged fluid droplets 4 accumulate. The fluid vaporizes on fiber 6, and the electric charge of fluid droplets 4 effects the charging of fibers 6. The process heat of fiber 6, which was produced by a meltblowing process, is used to vaporize the fluid. To improve the electric charge capacity, an additive may be admixed as a charge control agent with the polymers from which fibers 6 are produced. CHIMASSORB from the firm CIBA may be used as an additive, for example.

Figure 5:
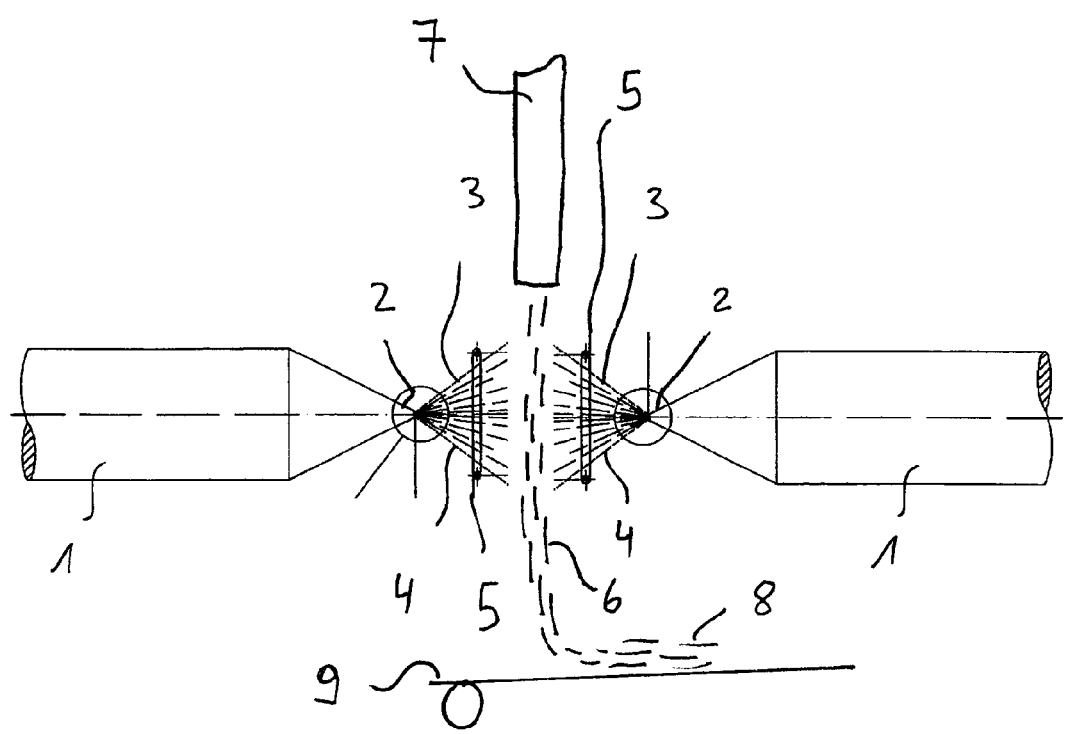
FIG. 5 is a schematic view of a process according to an embodiment of the present invention whereby fibers are passed through two spray mists.
Figure 6:
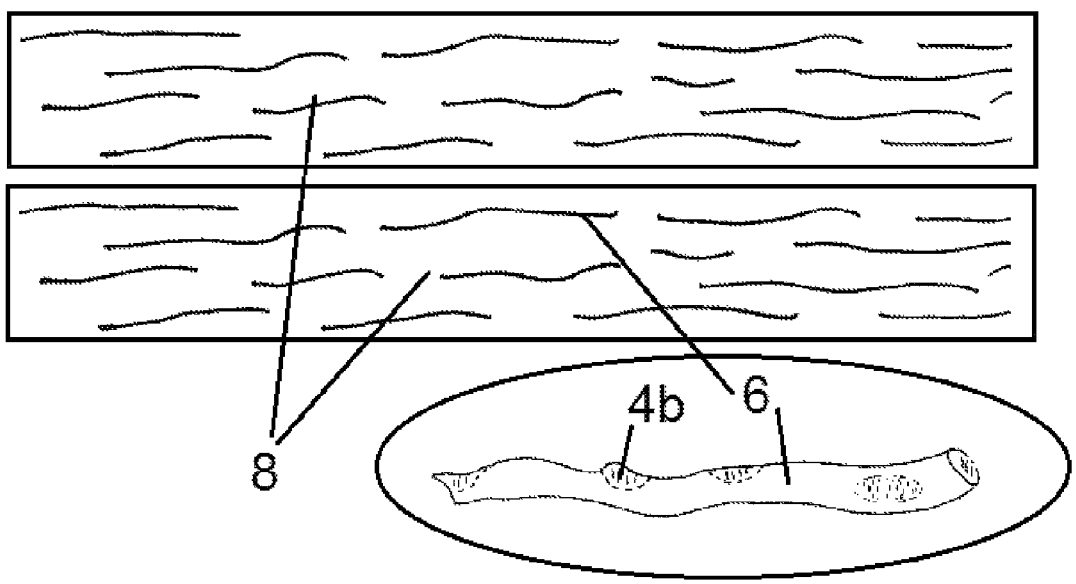
FIG. 6 is a schematic view of an embodiment of the present invention providing a laminate electret filter containing a second layer with fibers, and electrical charges inside of the fibers.

In a schematic view, FIG. 5 shows the implementation of a process whereby fibers 6 are passed between two opposite spray mists 3. Fibers 6 may be passed between two spray mists 3, fluid droplets 4 being electrically charged by oppositely or equidirectionally oriented electric fields between detaching fluid droplets 4a and respective counter-electrodes 5.

According to an embodiment, another electret filter element is then manufactured in accordance with the following process:

Fibers 6 are prepared, which are extruded from melt-blowing nozzle 7. Moreover, two opposing spray devices 1 are provided which produce two spray mists 3 of electrically charged fluid droplets 4. Spray mists 3 are configured as spray cones. Fibers 6 are passed between conical spray mists 3. Fibers 6 are passed through spray mist 3 on the side of respective counter-electrode 5 facing away from respective spray device 1. In the process, fibers 6 are wetted on both sides by fluid droplets 4. Fibers 6 are subsequently laid down to form a fibrous layer 8. The laying process takes place on a conveyor belt 9, so that a continuous production of a fibrous layer 8 is possible.

Fluid droplets 4 are electrically negatively charged by the electric fields between counter-electrodes 5 and detaching fluid droplets 4*a*. A nozzle is used as a spray device 1. Fibers 6 are produced and prepared in a melt-blowing process. Fibers 6 are microfibers which have a diameter of between 0.1 and 20 μm. The fluid is water. The fluid, respectively the water, features an electric conductivity that facilitates a polarizability of detaching fluid droplet 4*a* in response to the electric field strength present at the detachment site of fluid droplet 4*a*. The electric conductivity may be modified by a suitable additive, for example a conductivity salt, such as NaCl or ammonium hydrogencarbonate. It is preferable that the additive not remain on fiber 6. However, the additive may advantageously remain on fibers 6 in quantities that are not critical to the application in order to be verifiable using suitable analytics.

Finally, it is especially emphasized that the practical examples discussed above are merely intended for purposes of discussing the present invention, but not for limiting it thereto.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

The invention claimed is:

1. A method for manufacturing an electret filter element comprising:

preparing fibers;

producing, by a spray device, a spray mist of fluid droplets which include an electrical charge formed by an electric field between detaching fluid droplets and a counter-electrode;

passing the fibers through the spray mist so as to wet the fibers with the fluid droplets; and laying down the fibers to form a fibrous layer.

2. The method as recited in claim 1, wherein the electrical charge of ≥60% of the fluid droplets of the spray mist have the same polarity.

3. The method as recited in claim 1, wherein a polarity of the electrically charged fluid droplets is produced independent from a size of the fluid droplets.

4. The method as recited in claim 1, wherein the passing the fibers through the spray mist is performed on a side of the counter-electrode facing away from the spray device.

5. The method as recited in claim 1, wherein the spray device includes a nozzle.

6. The method as recited in claim 1, wherein the electrical field has a polarity that varies over time.

7. The method as recited in claim 1, wherein the preparing the fibers includes producing the fibers in a melt-blowing process.

8. The method as recited in claim 1, wherein the passing the fibers through the spray mist includes allowing the fluid droplets to vaporize on the fibers such that the respective electrical charges of the fluid droplets effect a charging of the fibers.

9. The method as recited in claim 1, wherein the laying down the fibers includes laying down a plurality of the fibrous layers on top of one another.

10. The method as recited in claim 1, wherein the producing the spray mist includes producing two of the spray mists through which the fibers are passed.

11. The method as recited in claim 10, wherein the electrical charges of the fluid droplets are produced by at least one of oppositely oriented and equidirectionally oriented electric fields between the detaching fluid droplets and the respective counter-electrodes.

12. The method as recited in claim 1, wherein the fluid of the spray mist includes a conductivity salt dissolved therein.

13. An electret filter element, comprising:

a first fibrous layer including fibers and electrical charges inside the fibers, wherein the electrical charges are formed by respective electrical charges of fluid droplets sprayed on the fibers, wherein the respective electrical charges are produced by an electric field between detaching fluid droplets and a counter-electrode, and wherein at least 60% of the electrical charges of the first fibrous layer carry charges of the same polarity.

14. The electret filter element as recited in claim 13, wherein the fibers of the first fibrous layer carry like charges.

15. The electret filter element as recited in claim 13, wherein the fibers of the first fibrous layer carry charges of different polarity, and wherein a plurality of the charges of different polarity are distributed over at least one of the fibers.

16. The electret filter element as recited in claim 13, wherein at least 80% of the electrical charges of the first fibrous layer carry charges of the same polarity.

17. The electret filter element as recited in claim 13, further comprising:

a second fibrous layer including fibers and electrical charges inside the fibers.

18. The electret filter element as recited in claim 17, wherein at least 80% of the electrical charges of the second fibrous layer carry charges of the same polarity.

19. The electret filter element as recited in claim 17, wherein the second fibrous layer has an opposite polarity to the first fibrous layer.

20. The electret filter element as recited in claim 17, having a γ-value of >0.14, wherein the γ-value is determined from the equation:

$$\gamma = [-\ln(\text{penetration})]/\text{pressure difference},$$

wherein the pressure difference is that between an incident flow side and an outflow side of the electret filter element, in Pascals, and ln (penetration) refers to values of between 0 and 1 for penetration, 1 denoting a 100% degree of penetration.

* * * * *